_US005442022A_

United States Patent [19]

Keita et al.

[11] Patent Number: 5,442,022
[45] Date of Patent: Aug. 15, 1995

[54] LOW YELLOW INDEX POLYMER COMPOSITIONS, POLYMERISABLE COMPOSITIONS AND LENSES USING SAID COMPOSITIONS

[75] Inventors: Gabriel Keita, Courbevoie; Joël Renaudineau, Creteil, both of France

[73] Assignee: Essilor International-Compagnie General D'Optique, France

[21] Appl. No.: 172,137

[22] Filed: Dec. 21, 1993

[30] Foreign Application Priority Data

Dec. 22, 1992 [FR] France .................. 92 15533

[51] Int. Cl.⁶ ........................................ C08F 232/04
[52] U.S. Cl. .................................. 526/309; 526/313; 526/286; 526/289; 522/181; 522/182; 522/178; 522/180
[58] Field of Search ............. 526/313, 309, 286, 289; 522/181, 182, 178

[56] References Cited

U.S. PATENT DOCUMENTS

| | | | |
|---|---|---|---|
| 4,443,588 | 4/1984 | Fukuda et al. | 526/301 |
| 4,931,523 | 6/1990 | Watanabe et al. | 526/292.3 |
| 4,959,429 | 9/1990 | Misura et al. | 526/230.5 |
| 5,235,014 | 8/1993 | Chen et al. | 526/301 |

FOREIGN PATENT DOCUMENTS

| | | | |
|---|---|---|---|
| 0059561A1 | 9/1982 | European Pat. Off. | C08F 20/36 |
| WO92/05209 | 4/1992 | WIPO | C08F 220/3 |

*Primary Examiner*—Mark Nagumo
*Attorney, Agent, or Firm*—Arnold, White & Durkee

[57] ABSTRACT

A polymer composition obtained by polymerisation of a polymerisable composition comprising: at least 50% by weight of a monomer or mixture of monomers having formula I

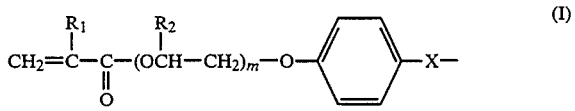

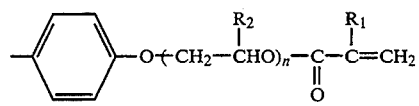

wherein $R_1$ and $R_2$, which may be identical or different, represent hydrogen or $C_1$-$C_6$ alkyl, X represents $$O, S, SO_2, -CO, -CH_2-, -CH=CH- \text{ or } -\underset{\underset{CH_3}{|}}{\overset{\overset{CH_3}{|}}{C}}-$$

and wherein m+n is between 0 and 10, 0 to 50% by weight of one or more mono- or polyfunctional vinyl, acrylic or methacrylic comonomers (II); 0.5 to 15% by weight with respect to the weight of components (I) and (II) of a compound having formula (III)

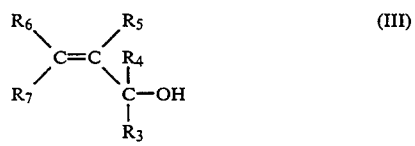

where $R_3$ and $R_4$ represent hydrogen or one of radicals $R_3$ and $R_4$ represents a hydrogen atom while the other forms a ring with $R_7$; $R_5$, $R_6$ and $R_7$ are hydrogen or an alkyl group which may be substituted by OH and/or interrupted.

16 Claims, No Drawings

LOW YELLOW INDEX POLYMER COMPOSITIONS, POLYMERISABLE COMPOSITIONS AND LENSES USING SAID COMPOSITIONS

The present invention relates to new polymer compositions for use in the manufacture of ophthalmic lenses, to their use in ophthalmology and to apparatus using these lenses, such as eyepieces and film/video camera optics.

Ophthalmic plastics obtained from acrylic bisphenol A derivatives are in general too yellow for use.

The use of additives which reduce yellowness is well known, but usually at the cost of the degree of polymerisation and thermomechanical properties.

Ophthalmic lenses may be produced in their final shape by casting polymerisable compositions between two moulds having the required surface geometries, then polymerising. A lens is then obtained with its two surfaces in their final state.

In order to reduce the need for large stocks of ophthalmic lenses, semi-finished lenses are often made which have one moulded side only in its final geometry, the second side being finished when required.

Finishing the second side raises the temperature of the semi-finished lens and it is therefore vital that the polymer constituting the lens is sufficiently rigid and non-deformable at the temperature attained. The polymer must therefore have good thermomechanical properties.

The applicant has discovered that it is possible to produce polymers for the manufacture of ophthalmic lenses in accordance with the invention which have good thermomechanical properties and a low yellow index making them particularly suitable for use in the manufacture of ophthalmic lenses from a copolymerisable composition comprising at least one monomer having formula

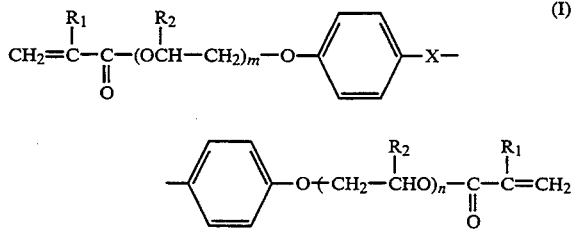

and a monomer derived from allyl alcohol. This composition constitutes an object of the invention.

Monomers having formula I are known and some of their derivatives have already been recommended for use in ophthalmology (GB-A-1 514 810, FR-A-2 431 511). In the latter document, monomers having formula I are used with monomers which are copolymerisable by a radical mechanism, wherein the homopolymer has an index greater than or equal to 1.55 to produce high index lenses.

Polymers produced from a monomer having formula I and the copolymers described in FR-A-2 431 511 are, however, too yellow to be usable in ophthalmology without modification.

The invention consists in polymers constituted by units derived from monomers having formula I and allyl alcohol derivatives.

The invention further consists in polymerisable compositions comprising monomers having formula I and allyl alcohol derivatives.

The invention further consists in ophthalmic lenses produced from these polymers, their use in ophthalmology and apparatus containing these optics.

Further objects of the invention will become apparent from the following description and examples.

A polymer composition in accordance with the invention is characterised in that it is obtained by polymerisation of a polymerisable composition comprising: (A) a component A comprising:

at least 50% and preferably 70 to 100% by weight of a monomer or mixture of monomers having formula I

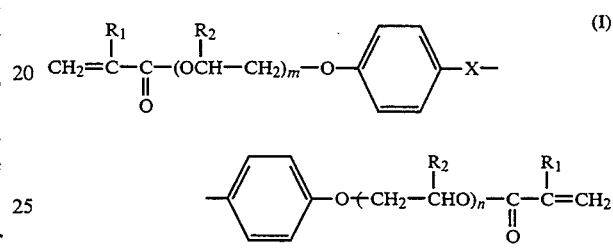

wherein $R_1$ and $R_2$ independently of each other may represent hydrogen or a low $C_1-C_6$ alkyl radical, X represents

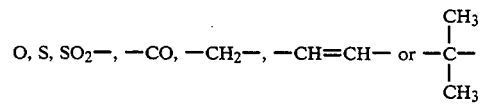

the sum $m+n$ being between 0 and 10, and 0 to 50% by weight of one or more mono- or polyfunctional vinyl, acrylic or methacrylic comonomers (II); (B) a component B in a proportion of 0.5 to 15%, preferably 1 to 5% by weight with respect to the weight of monomers (I) and (II) comprising monomers having formula (III)

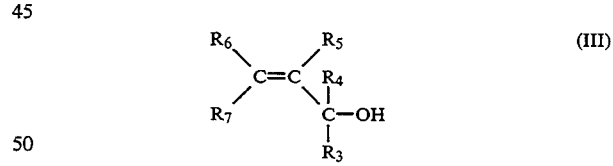

wherein $R_3$ and $R_4$ represent hydrogen or one of groups $R_3$ and $R_4$ represents hydrogen while the other forms with group $R_7$ a $C_5-C_{10}$ ring which may be substituted by one or more linear or branched $C_1-C_4$ alkyl groups; $R_5$, $R_6$ and $R_7$ independently of each other represent hydrogen or a $C_1-C_6$ alkyl group which may be substituted by one or more OH groups, and wherein the chain may be interrupted by one or more ether, ester or ketone groups, $R_7$ may form with one of groups $R_3$ or $R_4$ a $C_5-C_{10}$ ring which may be substituted by one or more linear or branched $C_1-C_4$ alkyl groups.

In accordance with the invention, the $C_1-C_6$ alkyl group preferably represents a methyl or ethyl group.

Particularly preferred monomers having formula I are those wherein $R_1$ and $R_2$ represent hydrogen and X represents

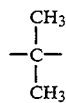

and m+n is a whole number between 2 and 7. Particularly preferred monomers having formula III are those wherein $R_3$ and $R_4$ represent hydrogen, $R_5$ represents methyl, $R_6$ represents hydrogen or methyl and $R_7$ represents hydrogen, methyl, ethyl or $CH_2OH$.

Preferred polymers are those wherein the monomer having formula I is 2,2-bis (4-methacroyloxydiethoxyphenyl)propane.

Monomers having formula II may be aromatic or non-aromatic.

The following monofunctional aromatic compounds may be cited: phenyl(meth)acrylate, benzyl(meth)acrylate, phenoxyethyl(meth)acrylate, styrene.

The following non-aromatic compounds are preferred: a monofunctional alkyl(meth)acrylate such as methyl(meth)acrylate, ethyl(meth)acrylate, butyl(meth)acrylate or isobutyl(meth)acrylate or difunctional derivatives such as butanedioldi(meth)acrylate, or trifunctional derivatives such as trimethylolpropane tri(meth)acrylate.

Particularly preferred monomers having formula III are allyl alcohol, methallyl alcohol, crotyl alcohol, 2-cyclohexene 1-ol, trans 2-hexene 1-ol, cis 2-butene 1,4-diol, and 3-methyl 2-butene 1-ol.

Polymerisation is effected in a known manner using an initial mixture containing the various monomers of the polymerisable composition, the polymerisation reaction being catalysable using catalysts such as benzoyl peroxide, cyclohexyl peroxydicarbonate, diisopropyl peroxydicarbonate or 2,2'-azo-bis isobutyronitrile. The catalysts are used in quantities sufficient to initiate or maintain polymerisation and are normally present in proportions of between 0.001 and 1% by weight with respect to the total weight of the polymerisable composition.

Ophthalmic lenses are prepared by introducing the desired composition containing the various monomers described above into an apparatus constituted by a glass two-part mould and initiating a thermal polymerisation cycle of 10 to 20 hours duration at about 45° C. to 90° C., preferably about 50 to 85° C. It is also possible to polymerise photochemically or by induction heating using electromagnetic radiation, such as microwaves (2 450 MHz or 915 MHz) or high-frequency radiation (3.56 MHz; 27.12 MHz or 40.68 MHz).

Polymerisation by induction heating is normally completed in a period of less than one hour.

The polymer lens thus produced is then annealed for a period and at a temperature sufficient to eliminate residual stresses in the lens. The temperature is generally between 100 and 120° C. and annealing is carried out for about 1 to 5 hours.

It is also possible to effect polymerisation using moulds with one surface conforming to the final lens geometry and a second surface which does not conform to the final lens surface geometry but produces a second lens surface which can be finished when required.

The invention also consists in a polymerisable composition as defined above when used in the preparation of polymer compositions.

The polymers thus obtained, particularly following moulding, may be used to produce ophthalmic components such as ophthalmic lenses, spectacle or eyepiece lenses, and the optics of various devices including cameras, film/video cameras and microscopes, for example.

The yellow index is determined spectroscopically and visually. A standardised method is used to determine the yellow index by the spectroscopic method (ASTM D-1925-63). The yellow index is defined as follows:

$$Y_i = \frac{(127.5X = 105.8Z)}{Y}$$

where X, Y, Z are trichromatic coordinates of the sample measured using a UV-visible spectrophotometer scanning the spectrum from 380 to 780 nanometers. Yi is determined after annealing.

The visual method uses four standard glass samples containing increasing quantities of yellow dye to establish a range of yellows. Samples are classified according to their respective levels of yellow.

The degree of polymerisation is determined by measurement of the near infrared peak for the methacrylic group double bond by observing the area of the 6160 $cm^{-1}$ peak which corresponds to the first harmonic of the terminal methylene group CH bond vibration. The degree of polymerisation is given by:

$$p = \frac{\text{Area}(t = 0) - \text{Area}(t)}{\text{Area}(t = 0)}$$

Thermomechanical properties are determined using a three point bending TMA apparatus. Lens rigidity is characterised by the high temperature moduli in the rubber-like region.

The following examples illustrate but do not limit the scope of the invention.

In each case an initial mixture was prepared by homogenisation for one hour of specific amounts of tetraethoxy bis-phenol A dimethacrylate sold by AKZO under the trade name Diacryl 121 and, if required, methacrylic monomers (ethyl methacrylate, butanediol dimethacrylate). Cyclohexyl peroxydicarbonate was used as catalyst in a proportion of 0.5% with respect to the total formulation.

Allyl alcohol derivatives having formula III were introduced in the proportions indicated below just before casting into an apparatus constituted by two two-part glass moulds and an EVA gasket. The assembly then underwent an 18 hour thermal cycle starting from a temperature of 48° C. and arriving at 85° C. after 16 hours.

The polymerised articles thus produced were annealed for three hours at 110° C before measurement of their properties.

EXAMPLE 1

A mixture as described above was prepared by homogenising tetraethoxy bis-phenol A dimethacrylate sold by AKZO under the trade name Diacryl 121 and ethyl methacrylate in proportions of 92 parts Diacryl 121 to 8 parts ethyl methacrylate with stirring. This mixture was catalysed with 0.5% by weight of cyclohexyl peroxydicarbonate (CHPC). A composition having the following formula III was then introduced into the resulting composition:

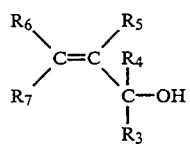

wherein $R_3$, $R_4$, $R_5$ and $R_6$ have the meanings shown in the table below.

TABLE I

| Additives | $R_3$ | $R_4$ | $R_5$ | $R_6$ | $R_7$ | mass % | Yi | visual | E (MPa) |
|---|---|---|---|---|---|---|---|---|---|
| ref | | | | | | 0 | 2.95 | 3 | 47 |
| allyl alcohol | H | H | H | H | H | 2 | 1.52 | 2 | 58 |
| methallyl alcohol | H | H | Me | H | H | 0.99 | 1.47 | 2 | 67 |
| crotyl alcohol | H | H | H | H | Et | 1.08 | 1.64 | 2 | 57 |
| trans 2-hexene 1-ol | H | H | H | H | Et | 2 | 1.81 | 2 | 60 |
| cis 2-butene 1,4-diol | H | H | H | H | $CH_2OH$ | 2 | 1.53 | 2 | |
| 3-methyl 2-butene 1-ol | H | H | H | Me | Me | 0.98 | 1.36 | 2 | |
| cyclo 2-hexene 1-ol | H | C | H | H | C | 2.06 | 1.64 | 2 | 59 |

"Yi" is the yellow index, "visual" is the visually determined index; E represents the modulus of elasticity in the rubber-like region (150° C.).

In each case, a considerable reduction in the yellow index and improvement in mechanical properties were observed.

EXAMPLE 2

The polymerisable composition of example 1 was used with the same catalyst in the proportions indicated in example 1. The following results were obtained:

TABLE II

| additive | % | Yi | p | E (100° C.) | E (150° C.) |
|---|---|---|---|---|---|
| allyl alcohol | 0 | 2.95 | 93 | 57 | 47 |
| allyl alcohol | 0.55 | 2.16 | 93 | | |
| allyl alcohol | 1.01 | 1.95 | 96 | | |
| allyl alcohol | 1.51 | 1.89 | 97 | | |
| allyl alcohol | 2 | 1.54 | 95 | 58 | |
| allyl alcohol | 2.45 | 1.48 | | | |
| allyl alcohol | 3 | 1.48 | | | |
| 2-methyl 2-propene 1-ol | 0.98 | 1.57 | >93 | 83 | 66 |
| 2-methyl 2-propene 1-ol | 1.47 | 1.54 | >93 | 87 | 77 |
| 2-methyl 2-propene 1-ol | 1.97 | 1.47 | >93 | 82 | 67 |
| 2-methyl 2-propene 1-ol | 2.48 | 1.47 | >93 | 89 | 74 |
| 2-methyl 2-propene 1-ol | 2.96 | 1.55 | >93 | 76 | 64 |
| 2-methyl 2-propene 1-ol | 3.9 | 1.75 | >93 | 71 | 62 |

EXAMPLE 10

A polymerisable composition was used comprising 85 parts by weight of Diacryl D 121 and 15 parts by weight of 1,4-butanediol dimethacrylate which had been homogenised as described above. 0.5% by weight of cyclohexyl peroxydicarbonate was used as catalyst. The following results were obtained:

TABLE III

| additive | % | Yi | p | E(150° C.) |
|---|---|---|---|---|
| allyl alcohol | 0 | 2.54 | 86 | 106 |
| | 1 | 2.26 | 89 | 133 |

TABLE III-continued

| additive | % | Yi | p | E(150° C.) |
|---|---|---|---|---|
| | 1.5 | 2.2 | 89 | 115 |

EXAMPLE 4

A polymerisable composition was prepared using tetraethoxy bis-phenol A dimethacrylate sold by AKZO under the trade name Diacryl 121. This monomer was mixed with 0.5% by weight of cyclohexyl peroxydicarbonate. The compounds shown in Table IV were then introduced as additives to give the results indicated below.

TABLE IV

| additive | % | Yi | p | E (100° C.) | E (150° C.) |
|---|---|---|---|---|---|
| 2-methyl 2-propene 1-ol | 10 | 1.73 | >93 | | |
| | 8 | 2.06 | >93 | 84.67 | 71.6 |
| | 5 | 2.13 | >93 | 88.97 | 73.58 |
| crotyl alcohol | 5 | 2.36 | >93 | 78.18 | 69.19 |
| 2-cyclohexene 1-ol | 5 | 1.87 | >93 | 49.34 | 53.42 |

EXAMPLE 5

Polymerisable compositions were prepared using the monomers shown in Table V.

TABLE V

| Example | Monomer I | Comonomers II | Composition | Initiator |
|---|---|---|---|---|
| 5A | D121 | isobornyl methacrylate | 80/20 | CHPC (0.5%) |
| 5B | D121 | benzyl methacrylate | 80/20 | CHPC (0.5%) |
| 5C | D121 | styrene | 80/20 | CHPC (0.5%) |
| 5D | D121 | | 100 | CHPC (0.5%) |

The results obtained are shown in Table VI.

TABLE VI

| Formulations | Yi after annealing | Yellow level |
|---|---|---|
| A | 2.32 | 4 |
| A + 2% methallyl alcohol | 1.17 | 2 |
| B | 2.3 | 4 |
| B + 2% methallyl alcohol | 1.21 | 2 |
| C | 1.75 | 3 |
| C + 2% methallyl alcohol | 1.39 | 2 |
| D | 4 | 4 |
| D + 2% methallyl alcohol | 1.9 | 2 |

Visual determination of the yellow level was carried out as follows:

level 0: corresponds to the colour of Orma without any addition of yellow dye (Orma is the trade name for a polymer material obtained from diethyleneglycol bis (allyl carbonate) manufactured by ESSILOR and used as a reference material;

level 1: Orma +0.0025% of yellow dye Neozapon 157;
level 2: Orma +0.01% of yellow dye Neozapon 157;
level 3: Orma +0.025% of yellow dye Neozapon 157.

The levels were determined in accordance with the following table.

```
less                                    more
yellow        levels                    yellow
         0      I     II    III         →
level 1  level 2  level 3  level 4  level 5
```

We claim:

1. A polymer composition obtained by polymerisation of a composition comprising:
a component A comprising
at least 50% by weight of a monomer or mixture of monomers having formula I:

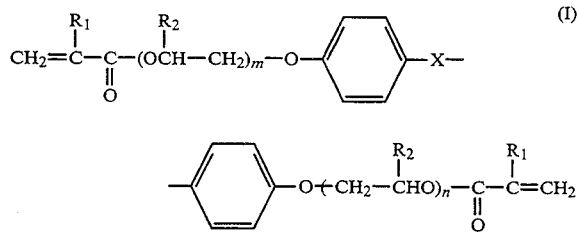

wherein $R_1$ and $R_2$, which may be identical or different, represent hydrogen or $C_1$–$C_6$ alkyl, X represents:

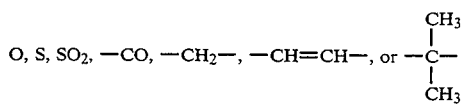

and m+n is an integer between 0 and 10, inclusive of 0 and 10;
0 to 50% by weight of one or more mono- or polyfunctional vinyl, acrylic or methacrylic comonomers (II); and
a component B:
comprising in a proportion of 0.5 to 15% by weight with respect to the weight of components (I) and (II), a compound having formula (III)

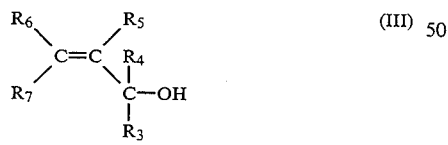

wherein $R_3$ and $R_4$ represent hydrogen or one of radicals $R_3$ and $R_4$ represents hydrogen while the other forms with $R_7$ a ring having 5 to 10 carbon atoms which may be substituted with one or more linear or branched $C_1$–$C_4$ alkyl groups; and
$R_5$, $R_6$ and $R_7$ are selected independently of each other from hydrogen or $C_1$–$C_6$ alkyl groups which may be substituted by one or more OH groups, and wherein the chain may be interrupted by one or more ether, ester or ketone groups, or $R_7$ may form with one of radicals $R_3$ or $R_4$ a $C_5$–$C_{10}$ ring which may be substituted by one or more linear or branched $C_1$–$C_4$ alkyl groups.

2. The polymer composition of claim 1, wherein the compound having formula I is used in proportions of between 70 and 100% by weight with respect to the weight of component A.

3. The polymer composition of claim 1, wherein $R_1$ and $R_2$ represent H or $CH_3$ and X represents

and m+n is an integer between 2 and 7, inclusive of 2 and 7.

4. The polymer composition of claim 1, wherein $R_3$ and $R_4$ represent hydrogen, $R_5$ represents methyl, $R_6$ represents hydrogen or methyl, $R_6$ represents hydrogen or methyl and $R_7$ represents hydrogen, methyl, ethyl or $CH_2OH$.

5. The polymer composition of claim 1, wherein the monomers having formula II are selected from the monofunctional aromatic compounds group consisting of phenyl(meth)acrylate, benzyl(meth)acrylate, phenoxyethyl(meth)acrylate and styrene, or from non-aromatic compounds selected from the group consisting of monofunctional, difunctional or trifunctional alkyl(meth)acrylates.

6. The polymer composition of claim 1, wherein the monomers are non-aromatic monomers selected from the group consisting of methyl(meth)acrylate, ethyl(meth)acrylate, butyl(meth)acrylate, isobutyl(meth)acrylate, butanediol di(meth)acrylate, and trimethylolpropane tri(meth)acrylate.

7. The polymer composition of claim 1, wherein the compound having formula I is 2,2-bis (4-methacroyl oxdiethoxyphenyl)propane.

8. The polymer composition of claim 1, wherein the compound having formula III is selected from the group consisting of allyl alcohol, methallyl alcohol, crotyl alcohol, 2-cyclohexene 1-ol, trans 2-hexene 1-ol, cis 2-butene 1,4-diol, and 3-methyl 2-butene 1-ol.

9. A method of preparing a polymer composition as defined in claim 1 comprising:
mixing one or more monomers having formula I and II and 0.5 to 15% by weight with respect to the weight of monomers having formula I and II an allyl alcohol derivative having formula III in the presence of a polymerisation initiator or catalyst;

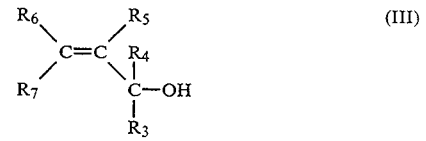

wherein $R_3$ and $R_4$ represent hydrogen or one of radicals $R_3$ and $R_4$ represents hydrogen while the other forms with group $R_7$ a $C_5$–$C_{10}$ ring;
$R_5$, $R_6$ and $R_7$ are independently of each other selected from hydrogen or $C_1$–$C_6$ alkyl groups, or $R_7$ may form with one of radicals $R_3$ or $R_4$ a $C_5$–$C_{10}$ ring; and polymerizing the mixture.

10. An ophthalmic lens made from a polymer resulting from a polymerization of a polymer composition obtained by the method of claim 9.

11. A method of preparing a polymer composition of claim 1, wherein the polymerisation of the polymerisable composition in accordance with claim is carried out photochemically.

12. A method of preparing a polymer composition of claim 1 wherein the polymerisation of the polymerisable composition is carried out by induction heating.

13. An ophthalmic lens made from a polymer composition according to claim 1.

14. A lens assembly characterized in that it comprises at least one lens as defined in claim 13.

15. A polymerisable composition comprising at least 50% by weight of a monomer or mixture of monomers having formula I:

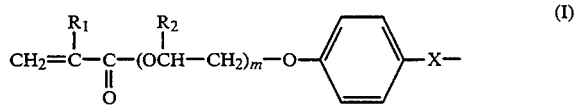
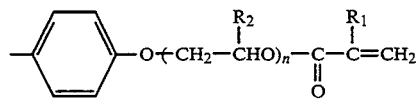

(I)

wherein $R_1$ and $R_2$, which may be identical or different, represent hydrogen or $C_1$-$C_6$ alkyl, X represent:

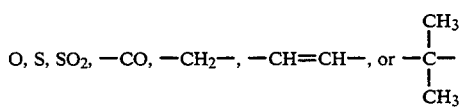

$O$, $S$, $SO_2$, $-CO$, $-CH_2-$, $-CH=CH-$, or $-\underset{\underset{CH_3}{|}}{\overset{\overset{CH_3}{|}}{C}}-$ and wherein m+n is an integer between 0 and 10, inclusive of 0 and 10;

0 to 50% by weight of one or more mono- or polyfunctional vinyl, acrylic or methacrylic comonomers (II); and a component B comprising:
in a proportion of 0.5 to 15% by weight with respect to the weight of components (I) and (II) of a compound having formula (III)

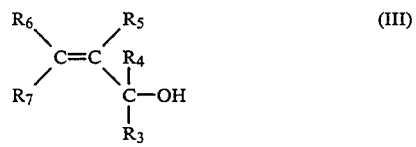

(III)

wherein $R_3$ and $R_4$ represent hydrogen or one of radicals $R_3$ and $R_4$ represents a hydrogen atom whilst the other forms with $R_7$ a ring having 5 to 10 carbon atoms which may be substituted with one or more linear or branched $C_1$-$C_4$ alkyl groups; and $R_5$, $R_6$ and $R_7$ are independently of each other selected from hydrogen or $C_1$-$C_6$ alkyl groups which may be substituted by one or more OH groups, and wherein the chain may be interrupted by one or more ether, ester or ketone groups, or $R_7$ may form with one of radicals $R_3$ or $R_4$ a $C_5$-$C_{10}$ ring which may be substituted by one or more linear or branched $C_1$-$C_4$ alkyl groups.

16. A method of preparing a finished or semi-finished lens comprising casting a polymerisable composition according to claim 15 between two moulds having the required surface geometries and polymerizing the composition.

* * * * *